3,433,621
HALOVINYL MERCURIALS AS
PLANT DEFOLIANTS
Henry G. Braxton, Jr., Franklin Village, Mich., and Evelyn J. Lajiness, Mentor, Ohio, assignors to Ethyl Corporation, New York, N.Y., a corporation of Virginia
No Drawing. Filed Apr. 28, 1966, Ser. No. 545,869
U.S. Cl. 71—70                    5 Claims
Int. Cl. A01n 9/38, 5/00; C07f 3/10

ABSTRACT OF THE DISCLOSURE

Halovinylmercury compounds, such as bis(trichlorovinyl)mercury and trichlorovinyl mercuric chloride, have defoliating and/or phytotoxic properties.

---

This invention relates to the control of undesirable vegetation. More specifically, it pertains to a method for treating undesirable plant growth with novel herbitoxic compositions. In other words, the essence of this invention resides in the unexpected discovery that certain organomercury compounds possess desirable herbitoxic properties.

As used herein, the phrase "control of undesirable vegetation" means the partial or total modification of the growth of plants and embraces within its scope defoliation and the complete suppression or eradication of plants. The term "undesirable vegetation" refers to plants which are undesirable in a particular locus, as well as plant parts which are undesirable at a particular time. For instance, certain trees may be undesirable in a plot devoted to the profitable growth of another species of trees. In another instance, it may be desirable to defoliate; that is, to remove the leaves from the plant without killing the plant itself.

Thus, broadly, the object of this invention is to provide novel herbitoxic compositions and novel methods for controlling undesirable vegetation. More specifically, one of the objects is to provide novel compositions and methods for plant defoliation. Another object is to provide novel herbicidal formulations and methods for killing plants. Still another object of this invention is to provide compositions which are useful in treating forests. Other objects will be apparent from the following detailed description and claims.

The objects of this invention are accomplished by providing new herbitoxic compositions comprising a compound having the formula:

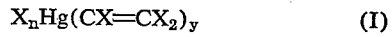

$$X_nHg(CX=CX_2)_y \qquad (I)$$

wherein X is chlorine, bromine, iodine, or fluorine, n is one or zero, and y is one or two, such that the sum of n and y is two. Two most preferred compounds are bis(trichlorovinyl)mercury and (trichlorovinyl)mercuric chloride.

Illustrative but nonlimiting examples of typical active ingredients of this invention are listed below.

(1) Bis(1-bromo-2,2-dichlorovinyl)mercury
(2) Bis(1-bromo-2,2-diiodovinyl)mercury
(3) Bis(1-bromo-2,2-difluorovinyl)mercury
(4) Bis(1-chloro-2,2-difluorovinyl)mercury
(5) Bis(1-fluoro-2,2-diiodovinyl)mercury
(6) Bis(1-fluoro-2,2-dichlorovinyl)mercury
(7) Bis(1-iodo-2,2-dichlorovinyl)mercury
(8) Bis(1-iodo-2,2-dibromovinyl)mercury
(9) Bis(1-iodo-2,2-difluorovinyl)mercury
(10) Bis(1,2-dichloro-2-iodovinyl)mercury
(11) Bis(1-chloro-2-fluoro-2-bromovinyl)mercury
(12) Bis(1-bromo-2-chloro-2-iodovinyl)mercury
(13) Bis(1,2-dibromo-2-chlorovinyl)mercury
(14) Bis(1-fluoro-2-iodo-2-bromovinyl)mercury
(15) Bis(1-chloro-2-fluoro-2-iodovinyl)mercury
(16) Bis(1-fluoro-2-chloro-2-iodovinyl)mercury
(17) (1-chloro-2,2-dibromovinyl)mercuric chloride
(18) (1-chloro-2,2-dibromovinyl)mercuric bromide
(19) (1-chloro-2,2-dibromovinyl)mercuric iodide
(20) (1-chloro-2,2-dibromovinyl)mercuric fluoride
(21) (1-chloro-2,2-diiodovinyl)mercuric chloride
(22) (1-chloro-2,2-diiodovinyl)mercuric iodide
(23) (1-chloro-2,2-difluorovinyl)mercuric bromide
(24) (1-chloro-2,2-difluorovinyl)mercuric chloride
(25) (1-bromo-2,2-dichlorovinyl)mercuric chloride
(26) (1-bromo-2,2-diiodovinyl)mercuric fluoride
(27) (1-bromo-2,2-difluorovinyl)mercuric iodide
(28) (1-bromo-2,2-difluorovinyl)mercuric chloride
(29) (1-iodo-2,2-difluorovinyl)mercuric chloride
(30) (1-iodo-2,2-dibromovinyl)mercuric iodide
(31) (1-iodo-2,2-dichlorovinyl)mercuric fluoride
(32) (1-iodo-2,2-dibromovinyl)mercuric chloride
(33) (1-fluoro-2,2-dichlorovinyl)mercuric bromide
(34) (1-fluoro-2,2-diiodovinyl)mercuric fluoride
(35) (1-fluoro-2,2-dibromovinyl)mercuric chloride
(36) (1-chloro-2-iodo-2-bromovinyl)mercuric bromide
(37) (1,2-dichloro-2-iodovinyl)mercuric chloride
(38) (1,2-dichloro-2-fluorovinyl)mercuric iodide
(39) (1-chloro-2-fluoro-2-iodovinyl)mercuric bromide
(40) (1-chloro-2-bromo-2-fluorovinyl)mercuric bromide
(41) (1-iodo-2-chloro-2-bromovinyl)mercuric chloride
(42) (1-iodo-2-chloro-2-bromovinyl)mercuric iodide
(43) (1-iodo-2-fluoro-2-chlorovinyl)mercuric fluoride
(44) (1-iodo-2-bromo-2-fluorovinyl)mercuric chloride
(45) (1,2-diiodo-2-chlorovinyl)mercuric bromide
(46) (1,2-diiodo-2-fluorovinyl)mercuric iodide
(47) (1,2-diiodo-2-bromovinyl)mercuric chloride
(48) (1-bromo-2-iodo-2-chlorovinyl)mercuric fluoride
(49) (1-bromo-2-chloro-2-fluorovinyl)mercuric bromide
(50) (1,2-dibromo-2-fluorovinyl)mercuric iodide
(51) (1-fluoro-2-iodo-2-bromovinyl)mercuric chloride
(52) (1,2-difluoro-2-bromovinyl)mercuric bromide
(53) (1-fluoro-2-chloro-2-iodovinyl)mercuric iodide
(54) (1,2-difluoro-2-iodovinyl)mercuric chloride
(55) (1-fluoro-2-chloro-2-bromovinyl)mercuric fluoride The class of compounds represented by general Formula I may be prepared by various methods available in the art. For the purpose of this invention, it is immaterial what specific method of preparation is employed since this invention is directed to the use of said class of compounds as herbitoxic materials. One method of preparation of the active ingredients of this invention is reported by Seyferth et al, Inorg. Chem. 1, p. 185 (1962).

In a preferred embodiment, the compositions of this invention contain an active ingredient (a compound of the type formulated and enumerated above and exemplified below) and a surfactant as a dispersant therefor. In a more preferred embodiment, the herbitoxic compositions contain an inert carrier as well as a surfactant and active ingredient. Typical surfactants and carriers employed in this invention are discussed below.

The methods provided by this invention for treating undesirable vegetation comprise contacting living plant tissue with one or more of the active ingredients described and enumerated above and exemplified below. In a preferred embodiment, the vegtation is contacted with a composition comprising one or more active ingredients and a surfactant as a dispersant therefor.

In a more preferred embodiment, the methods of this invention comprise the treatment of undesirable vegetation with a composition comprising one or more active ingredients, a surfactant as a dispersant therefor, and an inert carrier.

The surfactants employed in the instant invention have been commonly referred to in the art as conditionings agents, surface active agents, and surface active dispersing agents. They extend the active ingredient and promote its intimate contact with the vegetation to which it is applied. Furthermore, surfactants aid in the adaptation of the active ingredients for use in conventional application equipment. In general, from 0.1 to 15 percent by weight of a surfactant are employed in the compositions of this invention; however, greater and smaller amounts can be used, if desired. The combination of the active ingredients of this invention with a surfactant produces a herbitoxic composition having a greater effectiveness than could be expected from the activity of the individual components.

Typical examples of surfactants which are suitable for use in this invention are soaps, saponins, gelatin, casein, flour, sulfite lye, and synthetic cationic, anionic, and nonionic surfactants, and the like. Detailed lists of such agents are set forth by J. W. McCutcheon in "Soap and Chemical Specialties," December 1957; January, February, March, and April 1958; and in "Detergent and Emulsifiers Up to Date—1960," John W. McCutcheon, Inc., 475 Fifth Ave., New York, N.Y. A further discussion of surface active wetting agents is set forth by D. E. H. Frear in "Chemistry of Insecticides, Fungicides and Herbicides," 277–287, published by D. Van Nostrand Company, Inc. (1948).

Anionic surfactants comprise the largest class of surface active agents employed in this invention. Anionic surfactants are excellent wetting and dispersing agents. Soaps, which are probably the best known anionic surfactants, form insoluble materials in the presence of various metal cations, such as magnesium and calcium. Because of this, soaps are not preferred when these ions are present, and the more preferred anionic surfactants used in the compositions of this invention are the synthetic surfactants. This class includes materials such as sodium salts of sulfonated tallow, sulfonated coconut oil, sulfonated marine animal oils and sulfonated fatty amides. Long chain alkyl sulfates and long chain alkyl sulfonates such as lauryl, cetyl, stearyl, or oleyl-cetyl sulfates or sulfonates are also applicable. Sodium salts of phosphoric esters of fatty acids, sulfonated aromatics (such as sulfonated benzene derivatives, sulfonated naphthalene derivatives and sulfonated anthracene derivatives) can also be used. Sodium salts of alkaryl sulfonates, sulfonated terpenes, and sulfonated alkyl phenols can also be employed. Other preferred anionic surfactants are salts of sulfonated mineral oils, chlorosulfonated paraffinic hydrocarbons, sulfamides of paraffinic hydrocarbons, lignin sulfonates, and N-alkyl-N-fatty acid taurates.

Specific examples representative of the foregoing anionic surfactants are sodium dodecyl benzene sulfonate, sodium isopropyl naphthalene sulfonate (marketed under trademark "Aerosol OS" by American Cyanamid), the dioctyl ester of sodium sulfosuccinic acid (marketed under trade-name "Aerosol OT" by American Cyanamid), the bis-tridecyl ester of sodium sulfosuccinic acid (marketed under trademark "Aerosol TR" by American Cyanamid). Other examples are sodium aromatic sulfonate oxides such as those marketed by Nopco Chemical Company under the trade names "Agrimul N4R," "Agrimul N4S" and "Agrimul TL." Still other examples are the sodium salts of the sulfate esters of an alkyl phenoxypolyethyleneoxyethanol, such as the products marketed by Antara Chemicals under the trade names "Alipal CO–433" and "Alipal CO–436," and sodium salts of modified alkyl phosphate ester such as "Alipal MC–470," another product of Antara Chemicals. Further specific examples of suitable anionic surfactants may be found in the previously cited "Detergents and Emulsifiers Up to Date—1960."

Another class of surfactants suitable for use in many of the compositions of this invention is nonionic surfactants. This group of surfactants is especially useful in the preparation of emulsifiable oil formulations. When employed in these formulations, nonionic surfactants are extremely effective in emulsifying the oil formulation in an aqueous medium. Some examples of nonionic surfactants are polyglycol esters, polyoxyethyleneoxide alkylphenol, alkylaryl polyester alcohol, propyleneglycol monostearate, glyceryl monostearate, fatty alkylol amide condensates, coconut fatty alkylol amide, lauric alkylol amide. Many more examples of suitable nonionic detergents are listed in the aforementioned "Detergents and Emulsifiers Up to Date," supra.

Saponins are glucosides occurring in several species of plants, such as soapwort (*Saponaria officinalis*). The saponins can be hydrolyzed by mineral acids to yield sugars, such as glucose, galactose and arabinose together with sapogenins. Saponins form colloids with water and are effective nonionic detergents because they have the effect of reducing the surface tension of water.

Gelatins are proteins of animal origin which are used as an adjuvant in herbicidal compositions. Gelatins function as surface active agents inasmuch as they lower the surface tension of water while at the same time performing the further function of acting as sticking agents, causing the plant growth regulant compound to remain in intimate contact with the plant tissue over a prolonged period.

Casein is another protein preparation sometimes used in herbicidal compositions. The usual source of casein is milk. Casein, like gelatin, performs the dual function of both lowering the surface tension of water and acting as a sticking agent.

Flour also contains proteins similar to those found in gelatin and casein and has been used as both a wetting and sticking agent. Sulfite lye is a byproduct of the paper industry. It contains the water soluble portions of wood pulp and when concentrated forms a viscous liquid or dry powder. It is known to contain ligno sulfonic acid which is probably the surface active agent responsible for its beneficial properties.

The materials commonly known as carriers comprise another type of ingredient which are preferably employed in the compositions of this invention. The purpose of a carrier is to extend and facilitate the application of the active ingredient to the vegetation upon which it is applied. In general, carriers may be of two types, viz., solids and liquids. Liquid carriers include well known liquids such as water and various organic formulations. Typical liquid organic carriers are petroleum fractions such as kerosene and diesel fuel, aromatics such as benzene and toluene, ketones such as acetone and methylethylketone, esters such as amyl acetate, octyl acetate, and the like.

Typical solid carriers are inert solid extenders of mineral origin such as fuller's earth, kaolin, bentonite, china clay, various magnesium silicates, gypsum, pumice, mica, talc, attapulgite clay, and the like. Inert extenders of vegetable origin, such as soy bean flour, tobacco flour, ground walnut shells, ground pecan shells, and the like, can also be employed.

The herbicidal compositions of the present invention can also beneficially contain other adjuvants. Examples of such further adjuvants are corrosion inhibitors, perfumes, dyes, odor-masking agents and stabilizers. In addition, other herbicidal, fungicidal or insecticidal agents might be mixed with the herbicidal compositions of this invention in order to obtain enhanced or dual effects from the application of the resultant composition.

The type of herbitoxic composition is largely dictated by the type of carrier employed. For example, the use of liquid carriers yields liquid formulations such as solutions, suspensions, emulsions, and the like. Oil-in-water emulsions are the preferred type of emulsion; however, water-in-oil types can be employed if desired. The use of solid carriers yields compositions such as wettable powders, granules, and dusts. The various formulations are discussed below.

One formulation for applying the active compounds of this invention to undesirable plants is a solution or suspension of the active compound in a suitable aqueous or organic medium. In these formulations the solution or suspension of the compounds is contacted with the plant tissue whereupon the active ingredients exert their plant controlling effect. The organic medium may be a volatile solvent or it may be a higher boiling solvent such as kerosene.

When using a solution or suspension formulation, a preferred active ingredient concentration range is from about 0.5 to 100 parts by weight active ingredient per 250 parts by weight of formulation, although more or less can be used. A more preferred concentration range is from about 1 to 50 parts by weight active ingredient per 250 parts of formulation. A most preferred concentration range is from about 1 to 10 parts by weight active ingredient per 250 parts of formulation.

Emulsifiable oils are preferred formulations comprising the active ingredients of this invention. These are solutions or suspensions of the active compound in water-immiscible solvents together with a surface active agent. In these formulations the water-immiscible solvent is the carrier. Suitable water-immiscible solvents for the active compound of this invention are hydrocarbons, such as kerosene or xylene, and water-insoluble ethers such as dibutylcarbitol and dibutylcellosolve, esters such as amylacetate and ocylacetate, and ketones such as methylethylketone or dioctylketone.

The surface active agents employed in formulating emulsifiable oils are those which promote the formation of emulsions. Such surface active agents are listed in the previously cited J. W. McCutcheon, "Soap and Chemical Specialties." The preferred active agents used in preparing emulsifiable oils are the nonionic surfactants such as alkyl-, aryl-, polyethoxy alcohols, polyoxyethylene sorbitol, sorbitan fatty acid esters, polyethylene glycol fatty acid esters, fatty alkyllol amide condensates, amine salts of fatty alcohol sulfates, long chain alcohols, and anionic surfactants such as oil soluble petroleum sulfonates.

A preferred active ingredient concentration of the emulsifiable oil formulations of the present invention is from about 10 to about 90 weight percent. A more preferred active ingredient concentration in these formulations is from about 20 to about 75 weight percent. A most preferred active ingredient concentration in the emulsifiable oil formulations of this invention is from about 25 to about 50 weight percent.

A preferred water immiscible solvent concentration in the emulsifiable oil formulations of this invention is from about 10 to about 90 weight percent. A more preferred water immiscible solvent concentration is from about 40 to about 75 weight percent. A most preferred water immiscible solvent concentration is from about 50 to about 70 weight percent.

A preferred surfactant concentration in the emulsifiable oil formulations of the present invention is from about 0.5 to about 15 weight percent. A more preferred surfactant concentration is from about 1 to about 10 weight percent. A most preferred surfactant concentration in the emulsifiable oil formulations of this invention is from about 1 to about 5 weight percent. However, since the surfactant requirement will vary depending upon the active ingredient employed and the water immiscible solvent used, it is apparent that greater or lesser amounts of these ingredients can be employed, if desired.

In practice, the emulsifiable oil compositions of this invention are emulsified in water and the resultant emulsion used in the method of this invention in controlling undesirable vegetation. It is apparent that the concentration of the emulsifiable oil composition in the emulsion will be a function of the application rate desired and the concentration of active ingredient in the emulsifiable oil. A preferable quantity of the emulsifiable oil compositions emulsified in water is from about 2 to about 40 parts by weight of the emulsifiable oil composition per 250 parts by weight of final emulsion. A most preferred emulsifiable oil concentration in the emulsions used in controlling undesired vegetation is from about 4 to about 20 parts by weight emulsifiable oil compositions per 250 parts by weight of emulsion.

The compositions of this invention may be formulated in the form of wettable powders. These are water dispersible compositions which contain, in addition to the active compound, an inert solid extender and one or more surfactants which perform the functions previously set out. The preferred inert solid extenders used in this invention are of mineral origin, such as fuller's earth, kaolin, bentonite, china clay, and the like. The most preferred inert extenders used in the wettable powders of this invention are kaolin, bentonites, and magnesium silicates.

Surface active agents which can be used in combination with the other ingredients employed in producing wettable powders include all types previously described. The preferred surface active agents employed in the wettable powders are those than can be prepared in the solid form because these facilitate the blending of the wettable powder compositions. The most preferred wetting agents are anionic surfactants such as alkyl benzene sulfonates, alkyl naphthalene sulfonates, sulfonated fatty alcohols, sulfonated amines, sulfonated acide amides, sulfonated aliphatics, petroleum sulfonates, sodium lignin sulfonates, mixed alkylaryl sulfonates and sodium N-methyl-N-fatty acid taurates.

Occasionally, more than one of the above surface active agents are employed in the formulation of a single wettable powder. In these instances, one of the surface active agents may be particularly useful in dispersing the inert extender in an aqueous suspension, while the other surface active agent may be particularly effective in wetting the plant tissue to which the final suspension is contacted.

A preferred active ingredient concentration of the wettable powder formulations of this invention is from about 10 to about 90 weight percent. A more preferred active ingredient concentration is from about 20 to about 80 weight percent, and a most preferred active ingredient concentration in the wettable powder formulations of this invention is from about 50 to about 80 weight percent.

A preferred surfactant concentration in the wettable powder formulations of this invention is from about 0.5 to about 15 weight percent. A more preferred surfactant concentration is from about 1 to about 10 weight percent, and a most preferred surfactant concentration is from about 1 to about 5 weight percent.

A preferred quantity of inert carrier used in the wettable powder formulations of this invention is from about 10 to about 90 weight percent. A more preferred carrier concentration is from about 10 to about 75 weight percent, and a most preferred carrier concentration is from about 10 to about 50 weight percent.

For application in the control of undesirable vegetation, the wettable powder compositions of this invention are first dispersed in a liquid medium. Although nonaqueous liquid media may be used, a preferred liquid medium is water. It is again apparent that the quantity of wettable powder composition dispersed in the liquid medium is a function of the application rate desired and the concentration of active ingredient in the wettable powder. A preferred concentration range of the wettable powder compositions of this invention in aqueous dispersions of these compositions is from about 1 to about 20 parts by weight of wettable powder per 250 parts by weight of aqueous dispersion, and a most preferred concentration range is from about 2 to about 15 parts by weight of wettable powder per 250 parts by weight of aqueous dispersion.

Dusts are powder formulations which are intended for application in the dry form. Dust should be free flowing and have a high density. A high density promotes rapid settling of the dust and minimizes the transport of the dust vehicle by air currents. Dust formulations contain the active compounds and an inert extender. In addition, dust formulations usually contain wetting agents. The insert solid extenders used in dusts include both organic and inorganic powders which preferably are free flowing and possess high bulk density. The preferred inert solid extenders used in dust formulations are dense clays, talcs, pyrophyllite, "Phospho Dust" (trademark of the American Agricultural Chemical Company), and such organic materials as tobacco dust and ground walnut shells.

The preferred surface active agent employed in dust formulations are those available in the dry solid form. The most preferred surface active agents used in dust formulations are the same as those used in the previously described wettable powder formulations. Actually, the wettable powders previously described can be used as dusts. The major difference between wettable powders and dusts is that wettable powders contain a higher concentration of active ingredient and surface active agent and dusts preferably have a higher bulk density.

Dust formulations usually contain small amounts of grinding aid which facilitates the preparation of such dusts. Typical grinding aids are diatomaceous silica, silicas, calcium and magnesium silicates, and attapulgite clay.

A preferred active ingredient concentration employed in the dust compositions of this invention is from about 0.1 to about 25 weight percent. A more preferred active ingredient concentration is from about 1 to about 20 weight percent, and a most preferred active ingredient concentration is from about 1 to about 10 weight percent.

A preferred surfactant concentration used in the dust compositions of this invention is from about 0.01 to about 5 weight percent. A more preferred surfactant concentration is from about 0.1 to about 2 weight percent, and a most preferred surfactant concentration used in the dust compositions of this invention is from about 0.5 to about 1 weight percent. The balance of the dust compositions of this invention comprise inert free flowing dust and any other adjuvants that might be desired, such as corrosion inhibitors, antifoam agents, dyes, and the like.

Granule formulations are occasionally employed to contact the compositions of the present invention with living plant tissue. Granules are compositions of macroscopic dimension containing the active ingredient and generally a surface active agent. Suitable carriers for granule formulations are clays, pyrophyllite and vermiculite. The preferred carriers are of two types. The first are porous absorptive preformed granules such as preformed and screened granular attapulgite or heat expanded granular screened vermiculite. On either of these a solution of the active ingredient can be sprayed and will be absorbed at concentrations up to about 25 percent of the total weight. The second type of carriers are initially powdered kaolin, hydrated attapulgite clay or bentonite. These are blended with the active compounds to give mixtures that are granulated and dried to yield granular material with the active material distributed uniformly throughout the mass. Such granules can also be made with 25–30 weight percent active ingredient, but, more frequently, these formulations contain about 10 weight percent active ingredient. The usual size range of the granular formulations is from 15 to 30 mesh.

The most suitable surface active agents for the granular formulations of this invention depend upon the type of granule used. When preformed granules are sprayed with active material in liquid form the most suitable surface active agents are non-ionic liquid surface active agents immiscible with the solvent. These are generally known in the art as emulsifying agents. Examples of such agents are alkaryl polyether alcohols, alkyl polyether alcohols, polyoxyethylene sorbitol, sorbitan fatty acid esters, polyethylene glycol fatty esters, fatty alkylol amide condensates, and petroleum or vegetable oil sulfonates.

A preferred active ingredient concentration of the granular formulations of this invention is from about 1 to about 50 weight percent. A more preferred active ingredient concentration is from about 1 to about 40 weight percent, and a most preferred active ingredient concentration is from about 5 to about 30 weight percent.

A preferred surfactant concentration employed in the granular formulations of this invention is from about 0.01 to about 10 weight percent. A more preferred surfactant concentration is from about 0.1 to about 5 weight percent, and a most preferred surfactant concentration is from about 0.1 to about 1 weight percent. The balance of the granular formulations is preferably made up of about 15 to 30 mesh particulate inert mineral carrier.

The compounds of this invention are also effective when formulated in aerosol formulations. In these formulations the active compounds are dissolved in an extremely volatile solvent maintained under pressure in a confined space. Examples of volatile solvents used in these formulations are halogenated hydrocarbons, such as tetrafluoromethane, hexafluoroethane, mixed halogenated hydrocarbon compounds containing fluorine and chlorine such as difluorodichloromethane, pentafluoromethane, and the like. In some aerosol formulations other materials such as carbon dioxide, sulfur dioxide, hydrogen sulfide and ammonia can be used. When such compounds are included in the formulation, carbon dioxide is usually preferred.

One method of preparing such aerosol formulations comprises introducing the active compounds of this invention into a pressure cylinder and later introducing the volatile solvent under pressure, followed by mixing of the contents to obtain uniform solution. If desired, smaller containers can then be filled from the cylinder in which the formulation is prepared. In many cases, it is desirable to add a second solvent to the volatile solvent of the type described above so as to more readily dissolve the active compounds. Examples of such secondary solvents are benzene, acetone, carbon tetrachloride, and the like.

When aerosol formulations are discharged into the atmosphere in the form of a fine mist, the volatile solvent rapidly evaporates, leaving the active compounds of this invention suspended in the form of an aerosol. In like manner, when the aerosol formulations are contacted with the surface of a plant, the volatile solvent rapidly evaporates, leaving the active compounds of this invention in intimate contact with the plant tissue.

The active ingredients described in this invention are also useful in colloidal formulations. A colloidal formulation is prepared by passing a mixture of the active ingredient, a hydrocarbon solvent and a large amount of water through a colloid mill until homogenization of the oil and water is achieved.

The compounds used in the following Examples 1–12 will have the designations given below:

A. Bis(trichlorovinyl)mercury
B. (Trichlorovinyl)mercuric chloride
C. Bis(tribromovinyl)mercury
D. (Tribromovinyl)mercuric bromide
E. Bis(triiodovinyl)mercury
F. (Triiodovinyl)mercuric iodide
G. Bis(trifluorovinyl)mercury
H. Bis(1-chloro-2,2-dibromovinyl)mercury
I. Bis(1-chloro2,2-diiodovinyl)mercury
J. Bis(1-fluoro-2,2-dibromovinyl)mercury
K. (1-iodo-2,2-dibromovinyl)mercuric chloride
L. (1-bromo-2,2-dichlorovinyl)mercuric fluoride The following examples serve to illustrate the herbitoxic formulations of this invention. All percentages are by weight.

EXAMPLE 1

| | Percent |
|---|---|
| Compound A | 50 |
| Bentonite | 49 |
| Sodium alkyl benzene sulfonate | 1 |

The above wettable powder is prepared by blending the dry components and grinding until substantially all of the particles are smaller than 50 microns.

For application, the above wettable powder is dispersed in water in quantities equivalent to one pound of active ingredient per 30 gallons of water. The dispersion so formed is conveniently applied by the use of any of the various commercial sprayers.

EXAMPLE 2

|  | Percent |
|---|---|
| Compound B | 90 |
| Sodium alkyl naphthalene sulfonate | 0.5 |
| Kaolin | 9.5 |

The above wettable powder is prepared in the same manner as in Example 1. For application, it is dispersed in water at a rate equivalent to 10 pounds of active ingredient per 30 gallons of water.

EXAMPLE 3

|  | Percent |
|---|---|
| Compound C | 10 |
| Sodium lignin sulfonate | 10 |
| Attapulgite clay | 80 |

The above wettable powder is prepared in the same manner as in Example 1. For application it is dispersed in water at a rate equivalent to 5 pounds of active ingredient per 30 gallons of water.

In the above example, similar formulations may be prepared containing 20, 30, 40, 50, 60, 70, 80, or 90 percent Compound C and correspondingly smaller amounts of carrier.

EXAMPLE 4

|  | Percent |
|---|---|
| Compound D | 10 |
| Talc | 80 |
| Diatomaceous silica | 8 |
| Fatty acid amides | 2 |

The above dust is prepared by first grinding together the active ingredients, diatomaceous silica and fatty acid amide and then blending in the talc and thoroughly mixing.

This dust formulation can be applied using a tractor or airplane-mounted duster, at a rate of about 5 pounds of active ingredient per acre.

EXAMPLE 5

|  | Percent |
|---|---|
| Compound E | 20 |
| Magnesium silicate | 5 |
| Calcium phosphate dust | 74 |
| Petroleum sulfonates (sodium salt) | 1 |

The above dust is prepared in a manner similar to Example 4. It is conveniently applied to plant tissue using a tractor or aircraft-mounted duster.

EXAMPLE 6

|  | Percent |
|---|---|
| Compound F | 25 |
| Diesel fuel | 65 |
| Alkylaryl polyether alcohols | 10 |

The above emulsifiable oil is prepared by mixing the components until a homogeneous solution results.

The above composition is conveniently applied by dispersing the composition in water at a rate equivalent to two pounds of active ingredient per 30 gallons of water. It may then be applied using any suitable commercial sprayer.

In the above example, similar formulations may be prepared containing 10, 20, 30, 40, 50, 60, 70, 80, or 90 percent Compound F and correspondingly smaller amounts of diesel fuel.

EXAMPLE 7

|  | Percent |
|---|---|
| Compound G | 35 |
| Xylene | 60 |
| Polyoxyethylene sorbitol | 5 |

The above emulsifiable oil composition is prepared in the same manner as in Example 6. It is conveniently applied to plant tissue using a suitable tractor or airplane-mounted sprayer.

EXAMPLE 8

|  | Percent |
|---|---|
| Compound H | 50 |
| Amyl acetate | 49 |
| Polyethylene glycol fatty acid esters | 1 |

The above emulsifiable oil composition is prepared in the same manner as in Example 6. For application, it is dispersed in water at a rate equivalent to about 5 pounds of active ingredient per 30 gallons of water. It may then be applied using any suitable commercial sprayer.

EXAMPLE 9

|  | Percent |
|---|---|
| Compound I | 30 |
| Sodium alkyl naphthalene sulfonate | 5 |
| 15–30 mesh attapulgite | 65 |

The above granular composition is prepared by first dissolving the active ingredient and surface active agent in water and then spraying the solution on the carrier. Following this, the granules are dried. It may then be applied to plant tissue at a rate of from about 1 to 10 pounds of active ingredient per acre.

EXAMPLE 10

|  | Percent |
|---|---|
| Compound J | 5 |
| Alkaryl polyether alcohols | 1 |
| 15–30 mesh Attaclay | 94 |

The above granular composition is prepared in the same manner as employed in Example 9.

EXAMPLE 11

Into a cylinder rated at 100 p.s.i.g. working pressure is introduced 10 parts of Compound K. The cylinder is then made pressure tight except for one opening, through which is introduced a mixture of 10 parts of acetone and 50 parts of dichlorodifluoromethane, from a container holding this material under 2000 p.s.i.g. The cylinder into which the ingredients have been introduced is then sealed off and shaken to give a uniform solution of the active compounds in the volatile solvents. When sprayed into the atmosphere, this solution will form an effective aerosol of the active compounds employed.

EXAMPLE 12

A colloidal formulation is prepared by passing a mixture of 10 parts of Compound L, 100 parts of kerosene, 1000 parts of water, and 1 part of mannitan monooleate through the colloid mill until homogenation of the oil in water is achieved.

EXAMPLES 13 TO 672

Compounds 1–55 set forth above are incorporated, one at a time, in each of the foregoing Examples 1 through 12.

The compositions of this invention are extremely useful when employed in the method of this invention for controlling the growth of undesirable vegetation. Not only are they phytotoxic to many undesirable plants, but they are also useful as defoliants. The compositions of this invention are active as plant growth regulants at rates as low as one-tenth pound of active ingredient per acre. A preferred application rate is from 1 to 60 pounds of active ingredient per acre, and a most preferred application rate is from 5 to 10 pounds of active ingredient per acre. Higher or lower rates can be employed, depending upon the effect that the particular user desires to accomplish.

The compositions of the present invention are usually contacted with the leaves and stems of growing plants in the term's broadest sense, but can be applied to soil to obtain preemergence herbitoxic effects.

As appreciated in the art, the morphological effect obtained with the active ingredients of this invention may be influenced by the application rate, ambient temperature, humidity, and the time of the life cycle of the plant to which the compositions are applied. The effect usually desired of plant growth regulators is either defoliation or complete eradication of undesirable species. It is in these particular applications that the compositions of this invention are most useful. The following tests were carried out in order to demonstrate the useful properties of the compositions of this invention.

In test procedure A, the compounds were formulated as follows. Each compound was weighed into a small aluminum cup. The material was then washed into small beakers with about 5 ml. of acetone, followed by 15 ml. of water, giving a total volume of 20 ml. A quantity of this material containing 31 mg. of the test compound was then removed and water aded to it to bring its volume to 11 ml. At this point, 0.5 ml. of a one weight percent solution of Triton X-155 was added to the test solution and its volume then raised to 15 ml. by the addition of water. When this test solution is sprayed over an area of one-third square yard, it approximates an application rate of 30 gallons per acre containing one pound of test chemical per acre.

In some experiments the test compound was merely dissolved in acetone, so that 12 ml. of acetone solution contained 31 mg. of test compound.

The spray chamber used in carrying out subsequent tests was about 36 inches wide, 18 inches deep, and 26 inches high. It was made of clear plastic and the front of the chamber had sliding doors suitable for placing plants in and removing plants from the chamber. The top of the chamber had a hole for introducing the spray.

The compounds were examined by spraying them on 14-day-old Black Valentine bean plants and in some instances on privet plants at a rate equivalent to one pound of test compound per acre.

In the following Table I, the effectiveness of the compounds of this invention are expressed in terms of their phytotoxicity and their ability to cause abscission (defoliation). The abscission value is expressed in terms of the percentage drop of the total leaves on the plant (percent defoliation). At the time of spraying, the bean plants usually have two primary leaves. However, during the 14 days the plant is observed following spraying, two more (trifoliate) leaves usually emerge. Dropping of the two primary leaves would be recorded as 50 percent abscission. Dropping of all four leaves would be recorded as 100 percent abscission. Actually, dropping of the two primary leaves would constitute a total drop of all leaves actually contacted with the test compound.

Phytotoxicity is a measure of leaf damage (not to be confused with leaf droppage) and is estimated visually on a scale from 0 to 11, where 0 indicates no effect and 11 indicates all leaves killed. It is possible for a test chemical to have a phytotoxicity rating of 11 and yet have an abscission rating of 0, which means that although all leaves were killed, they remained on the plant.

Table I records the results obtained when a test formulation containing bis(trichlorovinyl)mercury and (trichlorovinyl)mercuric chloride were contacted with the previously described Black Valentine bean plants at a rate equivalent to one pound per acre. Results are given for the water formulation previously described. Observations were made at specific intervals, such as at 4, 8, and 13 days, but only the final results obtained at the end of 13 days are reported.

TABLE I.—ABSCISSION AND PHYTOTOXICITY RATINGS ON BLACK VALENTINE BEANS

| Concentration | Percent defoliation | Phytotoxicity |
|---|---|---|
| Bis(trichlorovinyl)mercury: | | |
| 0.1 lb./acre (water) | 15 | 1 |
| 1.0 lb./acre (water) | 10 | 10 |
| (Trichlorovinyl)mercuric chloride: | | |
| 0.1 lb./acre (water) | 0 | 1 |
| 1.0 lb./acre (water) | 25 | 3 |

Further tests were carried out to demonstrate the selectivity of the compositions of this invention. The procedure B consisted of formulating the test compound in either water or acetone mixtures as previously described. The formulated test compounds were then sprayed on seedlings of the woody species, pin oak, American elm, euonymus, and boxwood at rates equivalent to 1 and 5 pounds of test compound per acre. The seedlings were observed at specific intervals, such as at the end of 3, 8, and 13 days. The extent of abscission (defoliation) was rated as either light (L), moderate (M), severe (S), or total (T). The phytotoxicity was rated on the same scale (0 to 11) as was used in the Black Valentine bean tests. The following Table II shows the final results obtained when bis(trichlorovinyl)mercury and (trichlorovinyl)mercuric chloride were contacted with the exposed living tissue of the above-listed woody species, at rates equivalent to 1 and 5 pounds per acre.

TABLE II.—ABSCISSION AND PHYTOTOXICITY RATINGS ON DECIDUOUS AND EVERGREEN TREES

| | Bis(trichlorovinyl)mercury | | (Trichlorovinyl)mercuric chloride | |
|---|---|---|---|---|
| | Abscission | Phytotoxicity | Abscission | Phytotoxicity |
| American elm: | | | | |
| 1 lb./acre (water) | T | | S | 8 |
| 5 lb./acre (water) | T | 11 | T | |
| 1 lb./acre (acetone) | S | 11 | L | 11 |
| 5 lb./acre (acetone) | S | 11 | T | 6 |
| Pin oak: | | | | |
| 1 lb./acre (water) | M | 2 | | 4 |
| 5 lb./acre (water) | S | 7 | T | 1 |
| 1 lb./acre (acetone) | S | 3 | L | 5 |
| 5 lb./acre (acetone) | T | | L | 3 |
| Euonymus: | | | | |
| 1 lb./acre (water) | M | 1 | | |
| 5 lb./acre (water) | L | 1 | M | 1 |
| 1 lb./acre (acetone) | | | | |
| 5 lb./acre (acetone) | M | 2 | L | 1 |
| Boxwood: | | | | |
| 1 lb./acre (water) | | 1 | L | 2 |
| 5 lb./acre (water) | M | 5 | L | 3 |
| 1 lb./acre (acetone) | | 1 | | |
| 5 lb./acre (acetone) | M | 4 | L | 3 |

Still further tests were carried out on the compounds of this invention to more fully determine the effectiveness of such compounds. In test procedure C, the test compounds were dissolved in acetone containing 0.5% Tween 20. The concentrations were adjusted so that rates of 1.0 lb./acre and 0.1 lb./acre could be applied. Each rate was applied in duplicate to six different 7-day-old species. The test plants used were Black Valentine bean, Heavenly Blue morning-glory, Scarlet Globe radish, Lincoln soybean, Clinton oats and rice (P.I. 8970). At selected time intervals, the following effects were noted: abscission, chlorosis, contact injury, curvature, formative effects, galling, killing, necrosis, abnormal pigmentation, quilling, adventitious roots, and stunting. A rating system ranging from a value of 1 to 4 was used for each species. When the plant appeared normal, a rating of one was assigned, whereas when the plant was killed, a value of 4 was assigned. Thus, the ratings are such that a maximum value of 4 for each species may be obtained. Since there are six species and each may obtain a value of from one to four, the overall result will always fall within the range of from 6 to 24. The latter indicates complete kill of all the species, whereas the former indicates no effect. Final readings are obtained 10 to 14 days after application. The following Table III shows the final overall result obtained when bis(trichlorovinyl)mercury and (trichlorovinyl)mercuric chloride were applied on the above-described six species.

TABLE III.—SUMMARY OF HERBICIDAL PROPERTIES

| Concentration | Rating (based on a maximum value of 24) | |
|---|---|---|
| | Bis(trichlorovinyl) mercury | (Trichlorovinyl) mercuric chloride |
| 0.1 lb./acre | 9 | 6 |
| 1.0 lb./acre | 14 | 15 |

In test procedure D, the test compounds dissolved in acetone containing 0.5 percent of Tween 20 were sprayed at 10, 5 and 1 lb./acre concentrations on usually eight species: hemlock, spruce, elm, locust, maple, oak, privet, and pine. After about two weeks, the results of the test were noted and expressed as none (—), slight (S), moderate (M), or extreme (E) abscission and contact effect (desiccation), as shown in Table IV below.

TABLE IV.—ABSCISSION AND CONTACT RATINGS USING PROCEDURE D

| Concentration | Bis(trichlorovinyl) mercury | | (Trichlorovinyl) mercuric chloride | |
|---|---|---|---|---|
| | Abscission | Contact | Abscission | Contact |
| Hemlock: | | | | |
| 1 lb./acre | — | — | — | S |
| 5 lb./acre | — | S | — | S |
| 10 lb./acre | — | M | — | M |
| Spruce: | | | | |
| 1 lb./acre | — | — | — | — |
| 5 lb./acre | — | — | — | — |
| 10 lb./acre | — | S | — | S |
| Elm: | | | | |
| 1 lb./acre | — | — | S | M |
| 5 lb./acre | — | S | M | E |
| 10 lb./acre | M | E | S | E |
| Locust: | | | | |
| 1 lb./acre | S | S | — | S |
| 5 lb./acre | S | M | S | M |
| 10 lb./acre | S | M | — | M |
| Oak: | | | | |
| 1 lb./acre | — | S | — | M |
| 5 lb./acre | — | M | S | E |
| 10 lb./acre | — | M | S | E |
| Privet: | | | | |
| 1 lb./acre | — | S | — | S |
| 5 lb./acre | — | S | S | M |
| 10 lb./acre | — | S | S | M |
| Pine: | | | | |
| 1 lb./acre | — | — | — | — |
| 5 lb./acre | — | — | — | — |
| 10 lb./acre | — | — | — | S |
| Maple: | | | | |
| 1 lb./acre | — | S | — | S |
| 5 lb./acre | S | M | S | M |
| 10 lb./acre | M | E | S | M |

As noted above, certain herbitoxic formulations require an organic medium or a solvent. In addition to the solvents and the organic medium materials listed above, alcohols and sulfoxides may also be employed. Non-limiting examples of alcohols are 1-butanol, cyclohexanol, 1-octanol, 1-nonanol, and the remaining positional isomers, 2-methyl-1-nonanol, 2,8-dimethyl-5-nonanol, 1-dodecanol, 6-dodecanol, 1-tetradecanol, all positional isomers thereof, and the like. Illustrative examples of sulfoxides are dimethyl sulfoxide, diethyl sulfoxide, di-n-propyl sulfoxide, di-n-butyl sulfoxide, dibenzyl sulfoxide, and the like.

This invention can be extended to the treatment of species of plants other than those mentioned above, such as algae.

Having fully described the compositions of this invention and their novel uses, it is desired that this invention be limited only within the lawful scope of the appended claims.

We claim:
1. A method of defoliating and desiccating a plant, said method comprising contacting said plant with a defoliating and desiccating amount of a compound having the formula:

$$X_nHg(CX=CX_2)_y$$

wherein X is a halogen, $n$ is an integer having a value of zero to one, and $y$ is an integer having a value of one to two such that the sum of $n$ and $y$ is two.

2. A method of claim 1 wherein said compound has the formula $XHg(CX=CX_2)$.
3. A method of claim 1 wherein said compound has the formula $Hg(CX=CX_2)_2$.
4. A method of claim 3 wherein said compound is bis(trichlorovinyl)mercury.
5. A method of claim 3 wherein said compound is (trichlorovinyl)mercuric chloride.

References Cited

UNITED STATES PATENTS 2,209,905  7/1940  Ralston et al. _____ 71—97
3,294,830  12/1966  Horvitz et al. _____ 71—97

Sterlin et al.: "Reactions of Perfluorovinylmercury" (1961), C.A. 55, p. 15389 (1961).

Sumi et al.: "Phytotoxicity of Acetylene Mercury Compounds," (1958), C.A. 55, p. 4861 (1961).

Zimmerman et al.: "Plant Injury Caused by Vapors of Mercury, etc." C.A. 28, p. 5586 (1934).

Hitchcock et al.: "Toxic Effects of Vapors of Mercury, etc." (1957), C.A. 51, pp. 15716–17 (1957).

LEWIS GOTTS, *Primary Examiner.*

G. HOLLRAH, *Assistant Examiner.*

U.S. Cl. X.R.

71—97; 260—431